United States Patent [19]

Alkire

[11] 3,857,196
[45] Dec. 31, 1974

[54] MOISTURE SAVING APPARATUS
[76] Inventor: Carl M. Alkire, Rt. 1, Rose, Okla. 74364
[22] Filed: Aug. 15, 1973
[21] Appl. No.: 388,613

[52] U.S. Cl.................................. 47/48.5, 47/38.1
[51] Int. Cl............................................ A01g 25/00
[58] Field of Search ............... 47/34, 38, 38.1, 48.5

[56] References Cited
UNITED STATES PATENTS
1,992,878   2/1935   Muller ................................. 47/38.1
3,683,548   8/1972   Hagerty .............................. 47/38.1

FOREIGN PATENTS OR APPLICATIONS
466,630    1/1969   Switzerland
1,134,981  4/1957   France
1,173,421  12/1969  Great Britain Primary Examiner—Robert E. Bagwill
Attorney, Agent, or Firm—Richard A. Bachand

[57] ABSTRACT

Apparatus for catching, saving, and dispensing water within the earth includes a container having an upwardly oriented opening covered with a cap having a plurality of holes therein to allow the water seeping downwardly in the earth to flow into the container. A sponge through which the water can flow into the container is held in position beneath the cap by a screen across the opening of the container to prevent dirt from the overlying area from falling into the container. When the earth above the container is dry, the fluid within the container is conducted thereto by a wick extending through the cap, sponge, and screen between the dry earth and the fluid in the container. A saucershaped member is mounted around the container extending outwardly and upwardly from its opening to enhance the water capturing capability of the apparatus.

3 Claims, 1 Drawing Figure

PATENTED DEC 31 1974 3,857,196
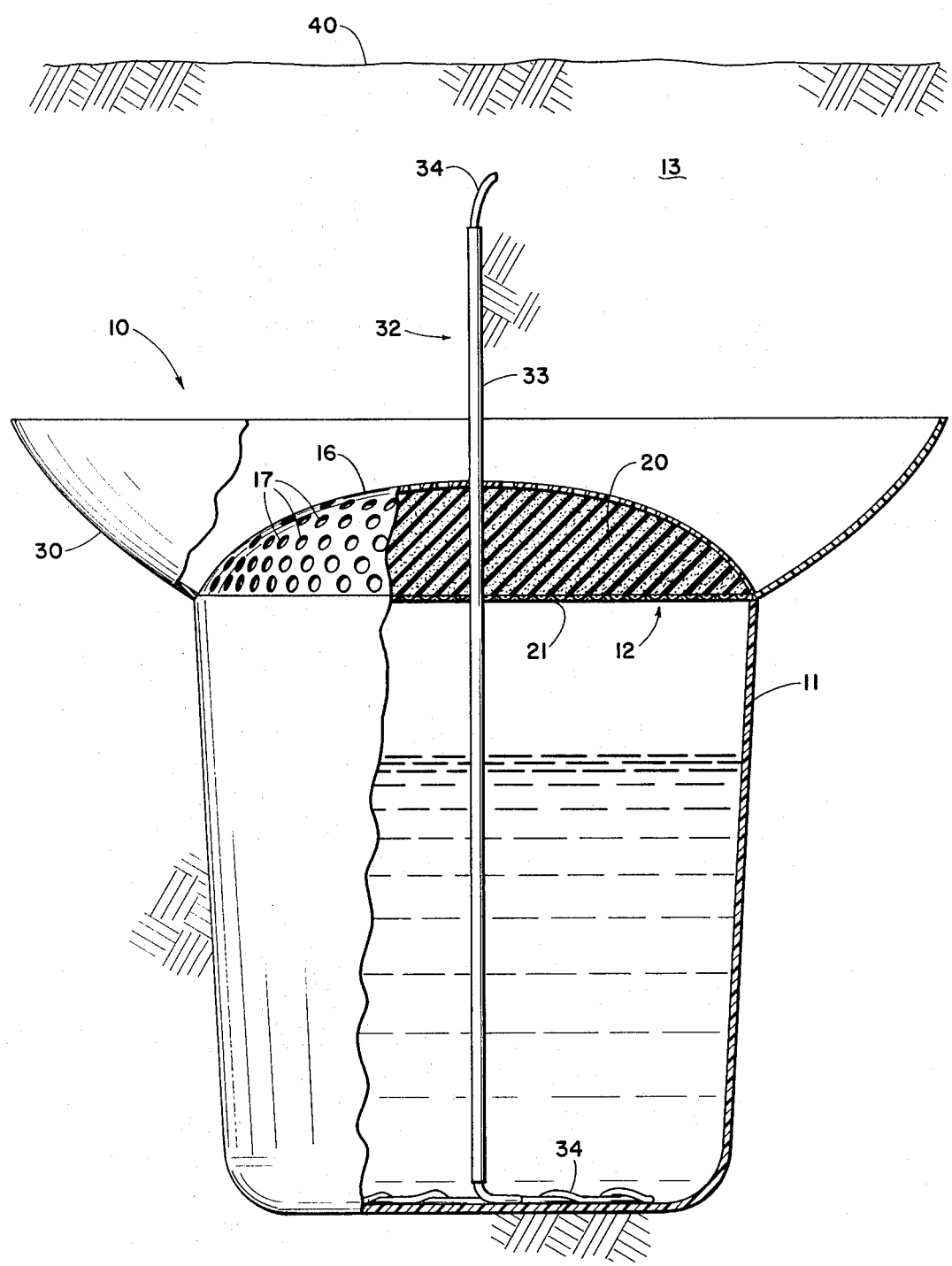

MOISTURE SAVING APPARATUS

BACKGROUND OF THE INVENTION

1. Field of the Invention

This invention relates to apparatuses for catching, saving, and dispensing water beneath the surface of the earth to control the moisture content thereof.

2. Description of the Prior Art

In farming operations in many areas of the country in which the rainfall is insufficient to maintain the crops the entire year around, crops commonly are watered or irrigated during dry seasons. For example, in many southwestern regions of the United States the water during wet seasons or in local rainfalls is conducted to and saved in reservoirs for subsequent plant irrigation. Such irrigation requires much labor and constant attention.

What is needed is a means for collecting and saving the water adjacent or in the vicinity of the plants themselves, during periods when the fluid is bountiful, then dispensing the fluid when needed during the dry season, for instance, to provide water for the plants or crops.

It has been proposed that capsules containing water be planted or buried along with the crop, the water within the capsule gradually seeping therefrom to supply water to the roots of the plant. Such capsules, however, do not regulate the water flowing therefrom, and, more importantly, once the fluid from within the capsule has been drained, the capsule must be replaced for future operations.

SUMMARY OF THE INVENTION

In light of the above, it is, therefore, an object of the invention to provide an apparatus for collecting, saving, and dispensing water beneath the surface of the earth to control the moisture content of the soil.

It is another object of the invention to provide an apparatus for catching and saving water during wet or rainy seasons and dispensing the water back into the ground during dry seasons.

It is another object of the invention to provide an apparatus for automatically dispensing water to within the ground to maintain its moisture content.

It is still another object of the invention to provide a continuously operating apparatus which requires little or no maintenance.

These and other objects, features, and advantages will become apparent to those skilled in the art from the following detailed description when read in conjunction with the appended claims and accompanying drawing.

The invention, in its broad aspect, presents a moisture saving apparatus adapted to be buried in the ground. The apparatus includes a moisture receiving container having an upwardly disposed opening, and a top covering the opening having a plurality of holes therethrough to permit water to flow into the container. An isolation member, which is a sponge, fiber, or the like, is provided under the top to permit water to flow into the container, to prevent the water within the container from escaping, and to prevent the sand and dirt above the container from falling into the container. A wick is provided extending into the container to conduct the water therein to a point remote from the container into the ground to maintain its moisture level when the moisture level falls below a predetermined amount.

BRIEF DESCRIPTION OF THE DRAWING

The apparatus, in accordance with the invention, is illustrated in the sole accompanying drawing showing the moisture saving apparatus, partly cut away, in location beneath the surface of the earth.

DESCRIPTION OF THE PREFERRED EMBODIMENT

The water saving apparatus, in accordance with the invention, is shown in the sole accompanying drawing, and is designated generally by the reference numeral 10. The apparatus includes a means for receiving moisture or water, such as a container 11. The container 11 and the other parts used in conjunction with the container 11, below described, can be of any suitable material such as metal, plastic, fiberglass, or the like, the primary consideration being its resistance to the underground elements to which it is exposed and the water or the fluid contained therewithin. The container 11 has an open top 12 which is upwardly disposed to receive fluid seeping or percolating downwardly from the overlying ground 13. A cap or top 16 having a plurality of holes 17 therein encloses the container 11. A sponge means 20 is mounted under the cap 16, held in place by a screen 21 extending across the opening 12 of the container 11. The sponge means 20 can be of ordinary sponge material, or any fiberous material which allows water to flow relatively freely therethrough into the container 11.

The sponge means 20 functions to enable the water percolating from the overlying ground 13 to enter the container 11 therethrough, and at the same time, to prevent the sand and dirt overlying the apparatus 10 from falling into the container 11. However, after the fluid is once contained within the container 11, the sponge means 20 prevents the fluid from escaping by evaporation, etc.

To further enhance the collection of water, a saucer-like dish 30 is mounted around the top of the container 11. Thus, the water is conducted by the saucer 30 to within the holes 17 of the cap 16, thereby to fall within the container 11.

A wick assembly 32 is provided and includes a wick holder 33 which extends through the top 16, the sponge layer 20, and the support screen 21 to the bottom of the container 11. The length of the wick holder is determined by the depth the apparatus 10 is buried and the distance from the top of the apparatus 10 to the location at which the water is to be dispensed. The wick holder 33 contains a wick 34 which protrudes a distance from the wick container 33 at the top and which is disposed along the bottom of the container 11. The wick 34 can be of any suitable material which conducts fluid along its length, such as a fiber rope, or the like.

The apparatus 10, in use, is buried beneath the surface 40 of the earth 13. The moisture or water from rainfall or other source drains through the earth 13 and is caught or received by the saucer 30 or directly upon the top 16, from where it is directed to within the container 11. The fluid within the container 11 is conducted back out from the container 11 via the wick 34. If the relative degree of saturation of the earth 13 above the apparatus 10 is greater than the relative saturation of the wick 34, no fluid will flow from within the container 11 by the wick. On the other hand, if the earth 13 is less saturated than the wick 34, the fluid will be released by the wick 34 into the surrounding soil and the contents of the container 11 will be expelled.

The depth at which the apparatus 10 can be buried depends upon the intended use, for instance, to supply moisture to the roots of plants at the surface 40, the type and length of root network, and so forth. The apparatus 10 commonly would be used in large numbers, for example, in a field for corn or other crop, buried at distances suitable to maintain the moisture content of the earth for the particular crop.

Although the invention has been described and illustrated with a certain degree of particularity, it is understood that the present disclosure is made by way of example only and that numerous changes in the combination and arrangement of parts may be resorted to without departing from the spirit and scope of the invention as hereinafter claimed.

What is claimed is:

1. A unitary moisture saving apparatus adapted to be entirely buried in the ground for catching and saving moisture comprising, a moisture receiving container having an upwardly disposed opening, a top covering the opening having a plurality of openings to permit water to flow therethrough into said container, a porous isolation member interposed between said top and a perforate support means therebeneath, whereby said top, isolation member, and support means prevent the ground materials from falling into said container, an upwardly extending saucer surrounding and extending outwardly from said top to catch water and conduct it into said container, and wick means extending from a location outside the container in the ground into said container to conduct the water therein to a point remote from the container.

2. The apparatus of claim 1 further comprising a tube carrying said wick means, and said wick means passes through said top and terminate near the bottom of said container.

3. The apparatus of claim 1 wherein said isolation member is a sponge and said support means is a screen.

* * * * *